J. W. Gardner,
Cutlery Handle.
No. 95,457.  Patented Oct. 5, 1869.
Fig. 1.
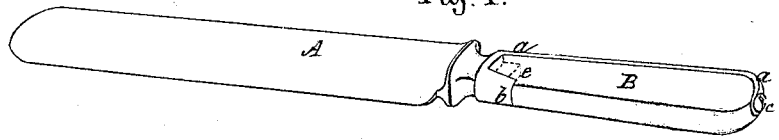
Fig. 2.   Fig. 3.
   
Fig. 4.
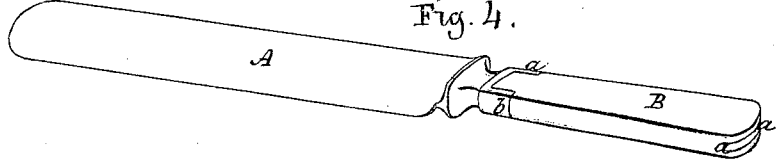
Witnesses.  Inventor.
Jno. D. Patten  J. W. Gardner.
Edmund Masson  By atty A.B. Stoughton.

United States Patent Office.

JOSEPH W. GARDNER, OF SHELBURNE FALLS, MASSACHUSETTS, ASSIGNOR TO "LAMSON AND GOODNOW MANUFACTURING COMPANY," OF SAME PLACE.

Letters Patent No. 95,457, dated October 5, 1869.

IMPROVEMENT IN ATTACHING HANDLES TO CUTLERY.

The Schedule referred to in these Letters Patent and making part of the same.

To all whom it may concern:

Be it known that I, JOSEPH W. GARDNER, of Shelburne Falls, in the county of Franklin, and State of Massachusetts, have invented certain new and useful Improvements in the Manner of Fastening the Handles to the Blades, &c., of Table-Cutlery; and I do hereby declare the following to be a full, clear, and exact description of the same, reference being had to the accompanying drawings, making a part of this specification, in which—

Figure 1 represents, in perspective, a table-knife with the handle united after my general plan.

Figures 2 and 3 represent cross-sections taken through the handle, to show how the bolsters are let into it.

Figure 4 represents, in perspective, a modification of the plan of uniting the bolster to the handle.

Similar letters of reference, where they occur in the separate figures, denote like parts in all of the drawings.

My invention consists in extending one of the bolsters, that are wrought on the blade, along one edge or side of the handle, and to and around the rear end of said handle far enough to form a firm hold or support there, which prevents the handle from getting loose by wear.

To enable others skilled in the art to make and use my invention, I will proceed to describe the same with reference to the drawings.

In fig. 1, a b represent the bolsters, wrought upon the blade A of a knife, of which bolsters the one, a, extends along the edge of the handle B, to and partially around the rear of the handle, where (in this modification) it is held by a small screw, c.

The other bolster, b, is quite short, as shown in the drawings, and both bolsters are let into the material of which the handle is composed, as seen in the sections, figs. 2 and 3, which forms a firmer union between the two.

A tongue, wrought on the blade, or with the bolsters, as seen in dotted lines at e, fig 1, may be used, which, entering a groove or recess in the end of the handle, gives greater stiffness and rigidity to the handle and blade. When a screw is used, as at c, to hold the handle and bolster together, they may be separated at any time, as, for instance, in plated cutlery, for the purpose of replating the blade.

In fig. 4, I have shown the same general plan of construction of bolsters, and their union with the handle, except that in this case the end of the bolster a extends further around the rear end of the handle B, and forms its own fastening or union with the handle, by being set down tightly and neatly into its groove or seat, by a suitable instrument or machine used for that purpose. In this case the handle cannot possibly get loose by wear, but it is not so readily removable as by the use of the screw, as in fig. 1.

Simply setting the rear end of the bolster down into and around the end of the handle, as in fig. 4, is sufficient, but if found essential, or desirable, a pin, rivet, or screw may be inserted in the end of the bolster, or said end may itself be turned or bent into an angular form, and enter a recess in the handle. In this modification, as in that at fig. 1, a tongue on the blade may enter a groove or recess in the end of the handle.

The bolster b extends a very short distance on its edge or side of the handle, as seen in the drawings. That distance is sufficient, but it may be extended further if so preferred.

By this mode of uniting the handle to table-cutlery, all large holes in the handle are avoided, leaving it comparatively a solid handle.

When holes of any size are made in handles of ivory, or what is termed ivory, and other equivalent material, it invariably checks or splits at such places, making it almost impossible to hold anything tightly.

I avoid this hitherto troublesome matter by my plan of uniting the handle and blade, not requiring any boring of the handle that would cause such checks or cracks.

Having thus fully described my invention,

What I claim therein as new, and desire to secure by Letters Patent, is—

Holding or uniting handles to cutlery, by extending one of the bolsters to and around the rear of said handle, as and for the purpose herein described and represented.

J. W. GARDNER.

Witnesses:
F. A. BALL,
H. O. SMITH.